United States Patent
Ferrari et al.

(10) Patent No.: US 7,395,182 B2
(45) Date of Patent: Jul. 1, 2008

(54) SYSTEM AND METHOD FOR THE DIMENSION CHECKING OF MECHANICAL PIECES

(75) Inventors: Andrea Ferrari, Ferrara (IT); Carlo Carli, Ferrara (IT)

(73) Assignee: Marposs Societa' per Azioni, Bentivoglio (BO) (IT)

( * ) Notice: Subject to any disclaimer, the term of this patent is extended or adjusted under 35 U.S.C. 154(b) by 154 days.

(21) Appl. No.: 10/563,513

(22) PCT Filed: Jul. 15, 2004

(86) PCT No.: PCT/EP2004/051506

§ 371 (c)(1),
(2), (4) Date: Jan. 6, 2006

(87) PCT Pub. No.: WO2005/013021

PCT Pub. Date: Feb. 10, 2005

(65) Prior Publication Data

US 2006/0173651 A1  Aug. 3, 2006

(30) Foreign Application Priority Data

Jul. 16, 2003  (IT) ............... BO2003A0429

(51) Int. Cl.
*G06F 19/00* (2006.01)
(52) U.S. Cl. ............... 702/168; 702/94; 702/95; 702/167; 700/175; 700/195

(58) Field of Classification Search ............ 702/94, 702/95, 167–168; 33/561, 366.15, 556, 558
See application file for complete search history.

(56) References Cited

U.S. PATENT DOCUMENTS

| | | | | |
|---|---|---|---|---|
| 4,901,256 A * | 2/1990 | McMurtry et al. | ........... | 702/168 |
| 5,297,203 A | 3/1994 | Rose et al. | | |
| 6,115,647 A * | 9/2000 | Carli et al. | ........... | 700/194 |
| 6,301,796 B1 * | 10/2001 | Cresson | ........... | 33/556 |
| 6,526,670 B1 * | 3/2003 | Carli | ........... | 33/503 |

FOREIGN PATENT DOCUMENTS

EP   0 872 787   10/1998

* cited by examiner

*Primary Examiner*—John E Barlow, Jr.
*Assistant Examiner*—Hien Vo
(74) *Attorney, Agent, or Firm*—Dickstein Shapiro LLP

(57) ABSTRACT

A system for performing dimension checkings of mechanical pieces is provided including a contact detecting probe with wireless transmission, for example through a single radiofrequency two-way communication link, to and from a base station connected to an interface unit. The probe includes a logic unit and a memory unit in which reside the values of some operation parameters, for example the transmission frequency and/or the activation mode of the probe. The values of the operation parameters can be modified in a programming phase, according to a method that foresees the wireless transmission of control signals from a manually operated control device—to the probe, for updating of the values among the selectable values of a sequence residing in the probe, and the acquisition of the current value.

19 Claims, 2 Drawing Sheets

SYSTEM AND METHOD FOR THE DIMENSION CHECKING OF MECHANICAL PIECES

TECHNICAL FIELD

The invention relates to a system for checking the position and/or the dimensions of mechanical pieces, including a checking probe with detecting devices, power supply devices, a logic unit, memory devices adapted for storing the value of at least one operation parameter of the checking probe, and a remote transceiver unit for the wireless transmission and reception of signals, and a base transceiver unit for the wireless transmission and reception of signals to and from the remote transceiver unit.

The invention also relates to a method for selecting the value of at least one operation parameter in a system for checking the position and/or the dimensions of mechanical pieces including a checking probe with a logic unit, memory devices, and a remote transceiver unit for the wireless transmission and reception of signals, a base transceiver unit for the wireless transmission and reception of signals to and from the remote transceiver unit, a display device, and a manually-operated control device connected with said base transceiver unit.

BACKGROUND ART

There are known checking systems and methods, for example in numerical control machine tools, for determining the position and/or the dimensions of machined workpieces by means of a contact detecting probe mounted in the machine that, in the course of a checking cycle, displaces with respect to the workpiece, touches the surfaces to be checked and responds to contact by wirelessly transmitting signals to a base station, typically located at a certain distance from the probe. The base station is in turn connected, by means of an interface device, to the numerical control unit that, by processing other signals indicative of the spatial position of the probe, obtains information about the position of the workpiece surfaces. The contact detecting probe can include electric batteries for the power supply of contact detecting circuits and devices for the wireless transmission that can occur, for example, by emitting electromagnetic signals of optical, or radio-frequency, type. As the probe is utilized just for short time intervals during the machining cycle of the associated machine tool, the associated detecting circuits and transmission devices are normally kept in a low power consumption "stand-by" state and powered-up only when there is the need to perform a checking cycle to optimize the life of the batteries. The probe activation, i.e. the switching from the "stand-by" state to the full powered-up state can take place by means of suitable switching devices located on the probe. These switching devices can be of the mechanical (microswitch) type, or remotely activated by means of activation signals, wirelessly transmitted from the base station. When the checking cycle ends, the probe circuits return to the low power consumption "stand-by" state either upon the wireless transmission of a suitable de-activation signal or, as an alternative, upon elapse of a predetermined time period. This time period can be calculated since the last useful signal transmitted from the probe in the course of the formerly mentioned cycle. In the event activation is implemented by means of a microswitch, de-activation is obviously implemented in a mechanical way.

Should there be a plurality of probes operating in a same working area, as frequently occurs, there can be foreseen a cycle for the selective activation of a selected probe, a cycle that foresees at first the activation of a plurality of probes and thereafter the selection further to a two-way exchange of identification and confirmation signals between the probes and the base station. Such a selective activation cycle is disclosed, for example, in U.S. Pat. No. 6,115,647.

In general, each probe is characterized by the value assumed by some parameters as, for example, those relating to the transmission frequency (more particularly in the case of radio-frequency transmission), to the activation mode (implemented in a mechanical way or by means of a wireless signal), to the signal that enables the identification of the probe (in the case of selective activation), to the operation/switching off time, and other parameters.

In the known systems, the values of the various parameters are defined and stored in the probe by programming devices with manually-operated switches ("dip-switches"), typically programmed at the time of installation of the probe in the associated machine.

The previously mentioned U.S. Pat. No. 6,115,647 illustrates and describes a similar device (more particularly, with reference to the reference number 29 in FIG. 2 and to the description in column 3, lines 57-61 and in column 4, lines 12-15).

This programming method is subject to some drawbacks. For example, should it be necessary to program many parameters, the number of manually-operated switches correspondingly increases and so problems in terms of layout dimensions are presented. These problems become quite significant also in consideration of the fact that market requirements call for ever smaller dimensions and frequently the operation for programming the switches, performed in a workshop environment, might accidentally dirty the switches and the nearby electronics.

In some systems including, for example, connections for the wireless transmission of signals of the optical type, there may be the need to program just one parameter, more specifically the interval of time whereafter the probe automatically switches off. In a similar case, the "dip-switch" located on the probe need not be provided and the time parameter can be programmed and stored in the probe in a "self-learning" phase. The "self-learning" phase includes the manually-operated activation of the probe in a specific way (for example by keeping the stylus deflected for a specified amount of time, or by mounting the battery with inverted polarity or in other ways that enable to differentiate the self-learning mode from the normal working mode), the subsequent de-activation, implemented in an analogous or reverse way or by a remote control transmitted from the base station, subsequently to a time interval either corresponding to the time that it is desirable to set as the switching off time, or in a known relationship (for example a multiple or a submultiple) with respect to said time, and the storing in the probe of the time interval, prior to suitable rounding off. This simple programming method is difficult or impossible to implement when it is necessary to set the values of more than one parameter or when such values are of other nature than a time interval.

DISCLOSURE OF THE INVENTION

Object of the present invention is to provide a system in which the typical values of the operation parameters characteristic of each probe can be modified in a simple, reliable and wireless controlled way, without burdening the system with special circuits.

A further object of the invention is to provide a method applicable to the system for modifying, by means of a wireless control, the values of the operation parameters, that is equally simple and reliable.

These and other objects are achieved by a system according to claim 1 and a method according to claim 15.

BRIEF DESCRIPTION OF THE DRAWINGS

The invention is hereinafter described in detail with reference to the enclosed sheets of drawings, given by way of non limiting example only, wherein.

BEST MODE FOR CARRYING OUT THE INVENTION

Figure 1:
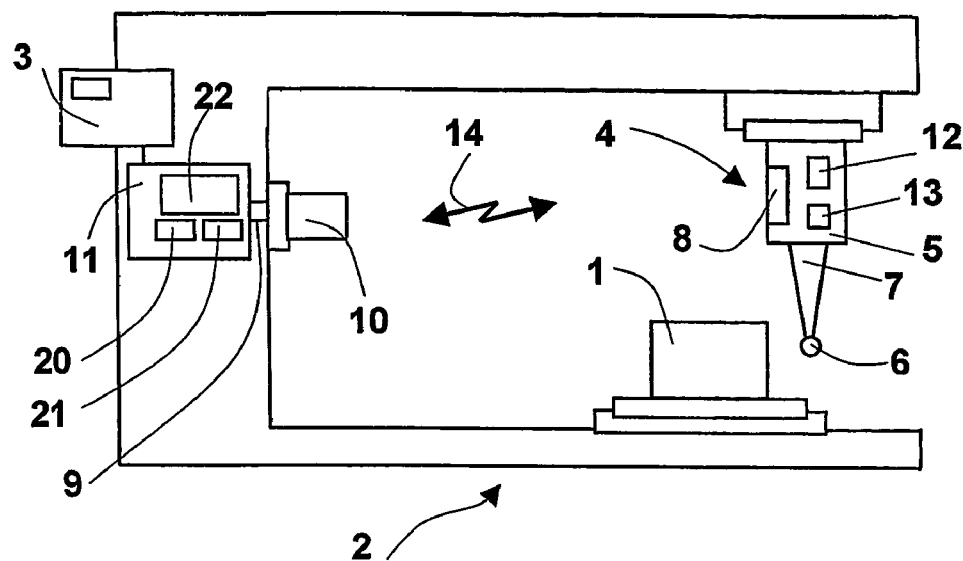
FIG. 1 shows, in simplified form, a checking system according to the present invention with a checking probe installed in a machine tool.

FIG. 1 illustrates, in simplified form, a system for detecting linear dimensions of a piece 1 in a machine tool, for example a machining center, identified in the figure by reference number 2, where piece 1 is machined. The system includes a computer numerical control 3, for superintending the operation of the machine tool 2, and a detecting apparatus including a checking probe 4. The latter, for example a contact detecting probe, has a support and reference portion 5, coupled to the slides of the machine tool 2, a feeler 6 and an arm 7 carrying the feeler 6 and movable with respect to the support portion 5. Moreover, probe 4 includes detecting devices, for example a microswitch 13, power supply devices 12 including a battery and a remote transceiver unit 8 for wirelessly and remotely transmitting and receiving signals to and from a base transceiver unit 10, or base station, preferably stationary, remote from probe 4. The remote transceiver unit (8) and the base transceiver unit (10) define a single wireless two-way communication link 14, for example for a radio-frequency transmission, or for the transmission of information by means of optical, acoustic or other signals. The base transceiver unit 10 is electrically connected, by means of a cable 9, to an interface unit 11 that is in turn connected to the computer numerical control 3. The base transceiver unit 10 serves to transmit—for example by radio—frequency—coded signals to the remote transceiver unit 8 of the probe 4 for activating and for de-activating probe 4 in response to a request coming from the computer numerical controller 3 through the interface unit 11, and to receive coded signals coming from remote unit 8 of probe 4 and also transmitted, for example, by radio-frequency. The received coded signals may indicate the spatial position of feeler 6 with respect to support portion 5, the level of charge of the battery of probe 4, the identity of the probe 4 in the event of a selective activation cycle according to the formerly mentioned U.S. Pat. No. 6,115,647, or other information. The terms activation/de-activation mean the switching of the power supply of probe 4 from/to an "inactivity" (or "stand-by") state in which just some low power consumption sections of the remote transceiver unit 8 are powered, to/from a "full" powered state of unit 8 and of the other units of the probe 4.

According to the present invention, the wireless two-way communication link 14 can also be used in a different phase of the probe operation, as hereinafter described.

A manually-operated control device-that in the illustrated example is integrated in interface unit 11, connected to the base transceiver unit 10, but that can be separately implemented, and connected to the base station 10 or to another base transceiver unit, manually-operated control device and base unit housed, for example, in a same casing-includes two keys, specifically ("select") key 20 and ("enter") key 21. An indicator device or display 22, for example with three figures with seven segments each, is also connected to the base transceiver unit 10.

Figure 2:
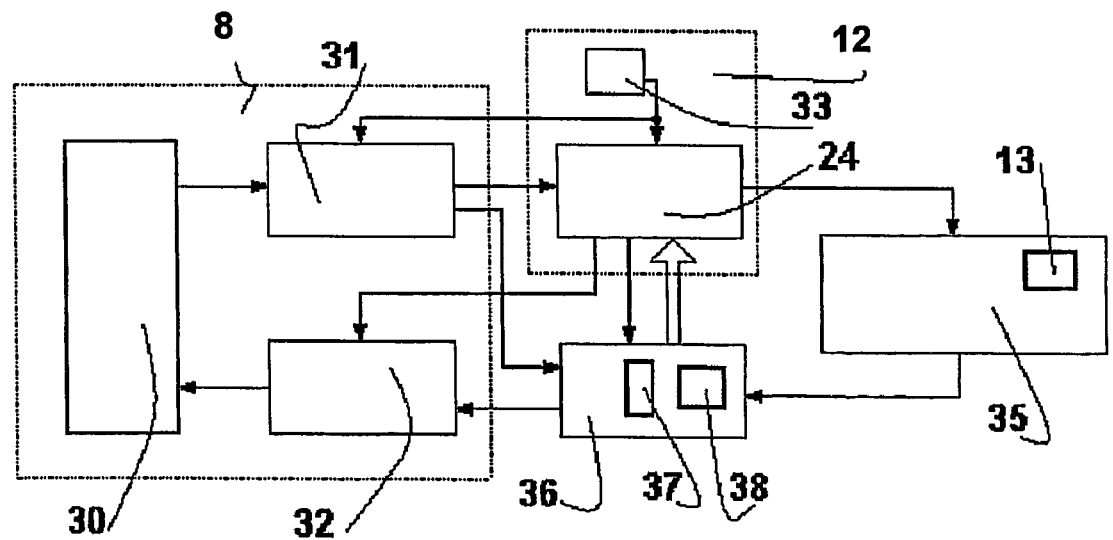
FIG. 2 is a block diagram of the circuits associated with the checking probe of FIG. 1.

In the illustrated example, the display 22 is integrated in the manually-operated control device and thus in the interface unit 11. Other indicator devices (for example, LED) can be included in the interface unit 11 for providing other visual indications (power supply of the interface unit 11, power supply and state of the probe 4, error, . . . ). FIG. 2 is a block diagram of the circuits of probe 4. The remote transceiver unit 8 includes a wireless communication device 30, more specifically one or more antennas in case of radio-frequency transmission. In the case of optical or acoustic transmissions, block 30 can represent optoelectronic devices as LEDs and photodiodes or ultrasonic transducers, respectively. It is also possible to implement mixed systems in which, for example, the activation of the probe occurs in an optical way and the transmission of the state of probe 4 occurs by radio-frequency. However, in this case there must obviously be present both optoelectronic devices and the antenna, and consequently this implies a more complex hardware and a rise of costs. Should all the signals be of the radio-frequency type, is it often possible to utilize a single antenna for both receiving and transmitting, thanks to its reciprocity features.

Function blocks 31 and 32 represent receiver circuits and transmitter circuits, respectively, both connected to the communication device 30.

The power supply devices 12 include the formerly mentioned battery (33) and power supply circuits 24, while monitoring and conditioning circuits 35 include the detecting device (microswitch) 13.

Logic circuits are present in a unit 36 that is connected to the receiver circuit 31, to the transmitter circuit 32, to the power supply circuit 24 and to the monitoring and conditioning circuit 35. Unit 36 ("logic unit") includes memory devices with a temporary register 37 and a non-volatile memory 38 electrically modifiable, for example of the EEPROM type, in which there are memorized, among other things, the values of some operation parameters of the system (transmission frequency, activation/de-activation mode, etc.) that are characteristic of each single probe 4.

The logic unit 36 provides and contains a coded sequence of selectable values of the operation parameters of the probe 4. The values of the former sequence are transmitted to the base station 10 by means of the wireless communication link 14 in the course of the programming phase that will be hereinafter described.

When probe 4 is in the "stand-by" condition, the only circuits that are permanently powered by battery 33 are the receiver circuits 31.

On receipt of a signal, the communication device (antenna) 30 sends a weak signal to the receiver circuits 31, the latter process the weak signal, more specifically strongly amplify and detect it. If the received signals has characteristics compatible with the useful one, the receiver circuits 31 enable the power supply of the logic unit 36 and send the detected signal to the logic unit 36 for subsequent processings. Once the logic unit 36 activates, it manages its power supply and the power supply of the monitoring and conditioning circuits 35 and of the transmitter circuits, for example in the manner described in the formerly mentioned U.S. Pat. No. 6,115,647.

Probe 4 can be in one of four different conditions:

not fully powered. The probe can be powered by mechanical switching devices (for example, a microswitch, implemented and operated in a different way with respect to the previously mentioned microswitch 13);

partially powered, in "stand-by" condition;

fully powered, in working condition;

almost fully powered (i.e. with the exclusion of the monitoring and conditioning circuits 35) in programming condition.

The operation of the system shown in FIG. 1 when switching from working conditions to "inactivity" conditions (not powered or partially powered) takes place in per se known ways and, partly, already previously described.

Briefly, further to contact occurring between feeler 6 and the surface of a piece 1 to be checked, microswitch 13 detects displacements of the arm 7 and generates detection signals that are processed and transmitted from the remote unit 8 to the base transceiver unit 10 by means of the remote communication link 14. Before the normal operation starts (and when it ends), activation (and de-activation) signals for fully powering the circuits of the probe 4 (and for causing the return to a "stand-by" state) are transmitted by the wireless communication link 14, from the base unit 10 to the remote transceiver unit 8, on the basis of signals generated by interface unit 11. Activation can occur on reception of a single signal, or on an exchange of a plurality of signals, for example as described in the formerly mentioned U.S. Pat. No. 6,115,647.

The following description refers to a procedure according to the invention that regards the programming phase, in other words the phase by which it is possible to select the value of one or more operation parameters that characterize the specific probe 4 and its associated interface unit 11, as the transmission channel (more particularly in the case of radio-frequency transmission), the activation mode (mechanic or by means of a wireless signal), the signal that enables the identification of the probe (in the case of selective activation), the operation/switching off time, and/or other parameters. From the herein just cited examples, it is obvious that the term "value" should not necessarily be intended as an immediately significant number (which is the case of the radio-frequency transmission channel, or the switching off time), but also, for example, as a figure that identifies the selection made among a type of setting as an alternative to other types (as in the case of the activation mode).

It is possible to set the fully powered probe 4 in the programming condition by operating key 21 of the manually-operated control device (i.e. interface unit 11, in the illustrated example) and so transmitting from the latter control device a signal P1 with preset frequency and duration time. Subsequently, information regarding the values of the various parameters stored in the non-volatile memory 38 of probe 4 is displayed in sequence on the display 22 and, by operating the keys 20 and 21, it is possible to control the sending of control signals from the base transceiver unit 10 by means of the wireless communication link 14.

In practice, the former control signals are used for sending the following controls:

C1 updates (increases) the value of the current parameter (for example the current transmission channel, in the case of radio-frequency system) starting from the value stored in the non-volatile memory 38. Furthermore, the value of the current parameter is sent in a continuous way by the remote transceiver unit 8 to the base unit 10 and displayed on the display 22.

Figure 3:
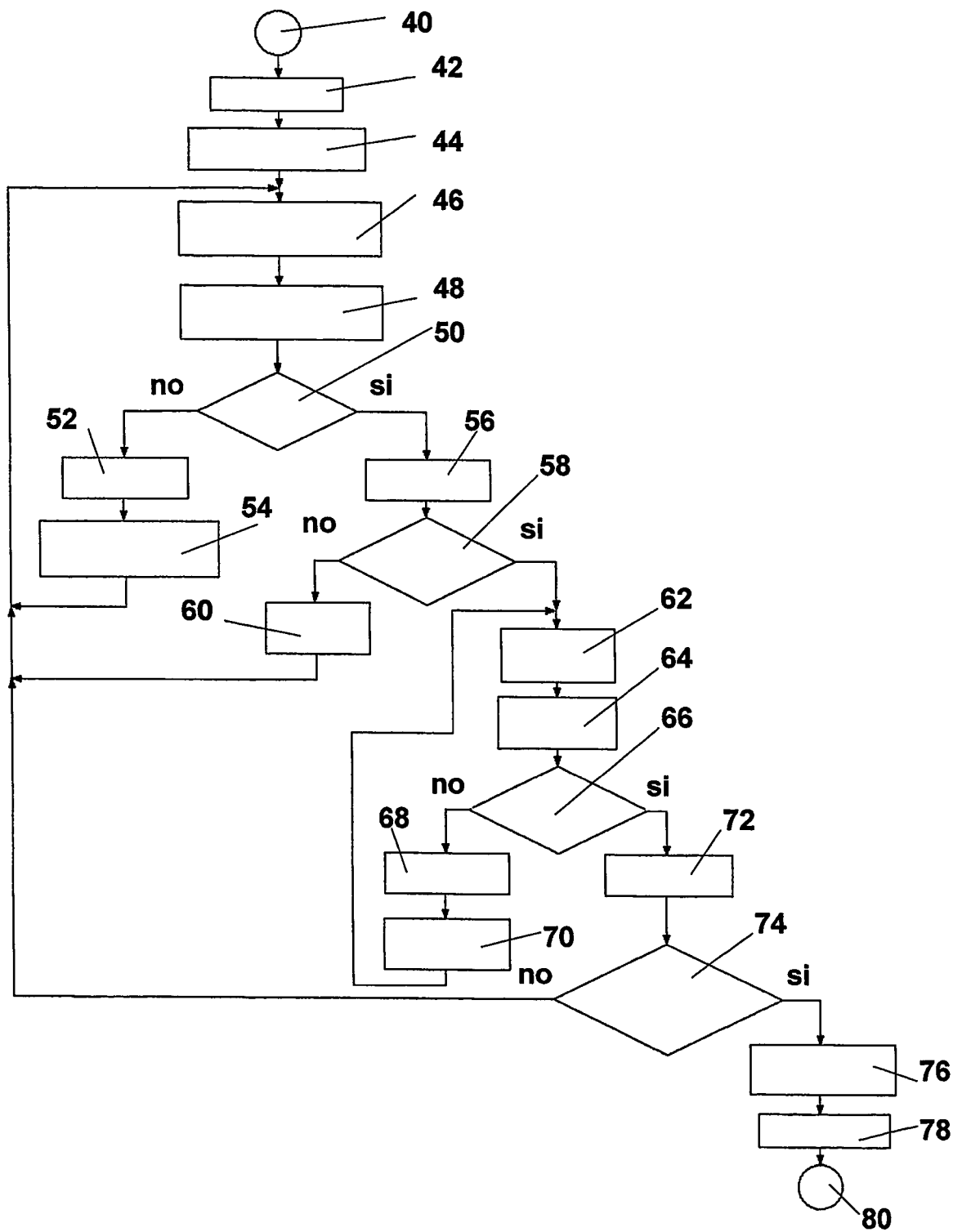
FIG. 3 is a flow chart showing a phase of operation of the system according to the invention.

C2 acquires (confirms) the displayed value. Logic blocks of the flow chart of FIG. 3, which refers to a method for programming the probe 4 according to the invention, mean as follows:

block 40—start of the programming phase;

block 42—sending of signal P1 from the base station 10 to the remote unit 8 by means of the wireless communication link 14 by pressing key 21 for a time period lasting longer than a minimum time period;

block 44—copying in the temporary register 37 of the data currently present in the non-volatile memory 38;

block 46—transmission—from the remote unit 8 and by means of the wireless communication link 14—of signals indicative of the value of a parameter currently present in the temporary register 37, for example the number of the radio-frequency transmission channel currently set;

block 48—display on the display 22 of information regarding the nature of the parameter and the current value;

block 50—visual check, by the operator, of the nature of the parameter and the correspondence between the associated value and the desired value, by observation of display 22;

block 52—sending of a control signal, that corresponds to control C1, from the base station 10 to the remote unit 8 by means of the wireless communication link 14, by pressing key 20;

block 54—increase in the temporary register 37 of the value of the parameter under consideration, according to the sequence coded in logic unit 36;

block 56—sending of a control signal, that corresponds to control C2, from the base station 10 to the remote unit 8 by means of the wireless communication link 14, by pressing key 21;

block 58—verification about the fact that the values of all the programmable parameters have been checked;

block 60—stepping on, in the temporary register 37, to the subsequent parameter to be checked;

block 62—transmission—from remote unit 8 and by means of the wireless communication link 14—of signals indicative of the option, that is currently present in logic unit 36, regarding the storing of the whole of the selections made;

block 64—display on the display 22 of indications regarding the option relative to the storage of the whole of the selections made;

block 66—verification about the confirmation of the visualized option;

block 68—sending of a control signal, that corresponds to control C1, from the base station 10 to the remote unit 8, by means of the wireless communication link 14, by pressing key 20;

block 70—modification, in logic unit 36, of the option relative to the storage of the selections made, according to the sequence coded in logic unit 36;

block 72—sending of a control signal, that corresponds to control C2, from the base station 10 to the remote unit 8, by means of the wireless communication link 14, by pressing key 21;

block 74—verification about the intention to store the selections made;

block 76—updating of the contents of the non-volatile memory 38 with the values of register 37;

block 78—sending a signal P2 with preset frequency and duration time from the base station 10 to the remote unit 8, by means of the wireless communication link 14, by pressing key 21 for a time period lasting longer than a minimum predetermined time period;

block 80—end of the programming phase.

In practice the programming of the probe 4 takes place as follows.

Once the programming phase has started (block 42), the current contents of the non-volatile memory 38 are shifted into the temporary register 37 (block 44) and the display 22 displays (block 48), on the basis of indicative response signals provided by the logic unit 36 and transmitted from the remote transceiver unit 8 (block 46), information regarding the first parameter to be considered and the associated currently set value, i.e. present in the non-volatile memory 38. In order to modify the value, key 20 is pressed (block 52) thereby causing the base station 10 to send control signals for giving the updating control C1, thereafter the value of the parameter under consideration is increased (block 54). In practice, the subsequent value that can be selected, in the sequence coded in logic unit 36 for the parameter under consideration, becomes the current selectable value and is displayed on the display 22 (block 48) on the basis of indicative signals transmitted from the remote unit 8 (block 46). When the operator who carries out the programming makes certain (block 50), by watching the indication appearing on the display 22, that the current selectable value of the parameter under consideration is the desired one, he confirms the selected value, that remains temporarily stored in register 37 of the logic unit 36. This is done by pressing key 21 and thus causing the manually-operated control device (i.e. interface unit 11 in the described example) to generate a control signal that corresponds to control C2 (block 56) and its associated transmission from the base unit 10. If not all the parameters have been checked (block 58) in the course of this programming phase, indications regarding the subsequent parameter (block 60) and its associated current value are transmitted from the remote unit 8 (block 46) and displayed on the display 22 (block 48). When the checking of all the parameters has been completed, it is possible for the operator to re-check and possibly even modify the value of one or more of them. More particularly, remote unit 8 transmits (block 62) and the display 22 displays (block 64) a value indicative of said option; this value can be modified (block 70) by pressing key 20 for sending control signals that give the control C1 (block 68). Once the desired option has been displayed, selection is confirmed by pressing key 21 (block 72), either (block 74, choice "no") for reconsidering and in case modifying the value of one or more parameters, or (block 74, choice "yes") for confirming the selections made. In this second case, the data temporarily saved in register 37 are stored in the non-volatile memory 38 (block 76). Thus the programming phase ends by sending from the base station 10 a signal P2 that has suitable frequency and duration time (block 78), similar to the signal P1 for starting the programming. As an alternative, it is possible to automatically exit from the programming phase after a specific time interval elapses and neither key 20 nor key 21 has been pressed.

According to another generally preferred alternative, there is the possibility that, after the saving in the non-volatile memory (block 76), the values of the just stored parameters be proposed again for performing further possible modifications (block 46) and that the programming phase can be interrupted by sending the signal P2 (block 78) at any time in the course of the procedure.

As already discussed, the control signals transmitted from the base unit 10 contain very simple information (controls C1, C2) that can be transmitted in an extremely reliable way even in a system in which the wireless transmission link from the base station 10 to the probe 4 has in some way limited performance—owing to technical reasons and/or involved costs—and is unsuitable for the transmission of signals with great information contents.

This feature of the invention is particularly advantageous especially in a system as the one herein described and illustrated in which the receiver of the remote unit 8 actually has some limitations, as a consequence of both the limited space available and the fact that, for optimizing the life of battery 33, it is necessary to minimize the power consumption of the receiver circuits 31 in the remote unit 8, which are the only circuits that are permanently powered. For example, in the case of transmission by radio-frequency, it is not possible to utilize a typical superheterodyne receiver, but a radio-frequency tuned amplifier followed by a diode amplitude detector and by a low frequency amplifier is generally used. As an alternative, it is possible to use a super-reactive receiver, that however gives rise to problems regarding critical behavior, aliasing, etc. Even the use, in the radio-frequency amplifier, of band-pass filters employing surface acoustic wave devices does not provide sufficiently narrow bandwidths for preventing the reception of interference signals on nearby frequencies, more particularly signals emitted by other probes belonging to other similar systems in operation in the surrounding area. Furthermore, it is practically inevitable to make use of the amplitude modulation instead of the frequency modulation, in consideration of both the difficulties in implementing a frequency demodulator in a non-superheterodyne scheme, and the need to avoid demodulating the signals transmitted by other similar probes, that are modulated in frequency. Moreover, the modulating signal cannot consist of coded pulses, because the low power consumption receiver would distort their duration too much, according to the intensity of the received signal, and could even add "tails" of parasitic pulses at the end of each real pulse. This situation occurs even in systems with optical or acoustic transmission. Therefore, it is practically compulsory to use, as a modulating signal, quite long trains of pulses the repetition frequency of which represents the basic information. In fact, it is sufficient to make sure that the receiver circuits 31 do not output integral multiple frequencies (harmonics) of the modulating frequencies for guaranteeing that the frequency of the signal remains unaltered. Therefore, in practice the radio-frequency carrier is amplitude modulated by a signal, the exact frequency thereof is significant.

In the case of optical transmissions, the transmitter LEDs are directly driven by the trains with defined frequency and can be intended as amplitude modulators of an electromagnetic wave with a frequency that corresponds to the wavelength of the emitted light; the receiver photodiodes can be intended as amplitude quadratic detectors, because they provide a current that is proportional to the incident optical power density, that is in turn proportional to the square of the associated electric field.

There is another limitation which is due to the fact that the transmissions by means of the single two-way wireless communication link 14 must never occur simultaneously in both ways, in order to prevent the receivers of the base unit or base station 10 and of the remote unit 8 from being "blinded" by their associated transmitters.

Thus it is important, for the reliability of the system, that the transmissions necessarily carried out for programming purposes have simple information contents, in addition to being short and rather spaced out with respect to each other. It should be realized that, by virtue of these latter characteristics, it is possible to utilize, for the signals transmitted to the probe 4, the same radio-frequency channel utilized for the selective activation according to the formerly mentioned U.S. Pat. No. 6,115,647. In fact, the method therein disclosed enables to implement the activation and to tolerate short interferences on the activation channel, and vice versa the possible (rare) interference caused by the activation procedure of a nearby system that simultaneously occurs to the pressing of one of the keys 20 or 21 can lead, in the worst case, to the missed reception of the associated signal by probe 4. In any case, the system allows the operator to immediately realize, by watching the display 22, that there has occurred the missed reception and immediately press again the key (20 or 21) without this rare circumstance causing appreciable inconveniences.

The simplicity of the system according to the invention also regards the operations performed by logic unit 36. Thus, the probe has no complex processing devices, like microprocessors, or other special hardware for the programming phase, but just memory units associated with the logic unit 36. On the other hand, the previously outlined generally limited performance of the system for wireless transmission towards probe 4 would not allow the reliable sending of instructions for a possible microprocessor, without making the system more complex and utilizing a distinct channel dedicated to the programming.

When the programming of probe 4 has been completed, it is necessary to get into programming mode for programming the interface unit 11, more specifically for programming, for example, the reception channel, that must obviously coincide with the one that has just been programmed on probe 4. Programming of the interface unit 11 can occur by pressing keys 20 and 21, according to a sequential procedure that is not herein disclosed in detail but is analogous to the one for the probe. The transmission channel and other parameters, already programmed as previously described for probe 4, can also be directly communicated to interface 11 by transmitting the information from the remote unit 8 to the base station 10. It should be realized that in this case a signal with more complex information contents can be transmitted in a reliable way owing to the fact that the receiver devices of the base station 10—which are of a known type—are not subjected to the same limitations as those of the corresponding devices of the remote unit 8.

An additional feature of the system according to the invention regards a recovery procedure that enables to manage even the condition in which the transmission channel set in probe 4 is not known, or there are corrupted data on the non-volatile memory 38. This procedure consists in placing in a specific condition ("recovery programming") first the manually-operated control device (more particularly the interface unit 11), by pressing again its keys 20 and 21, and then probe 4. As far as the probe 4 is concerned, a possible way for activating the "recovery programming" condition is that of removing the battery 33 and re-inserting it in a particular configuration, for example with the movable arm 7 deflected and the microswitch 13 consequently activated (open, if it is closed in the probe rest condition). Another possible way for activating the "recovery programming" condition can be that of inserting the battery 33 with inverted polarity.

Once the "recovery programming" condition has been activated, probe 4 starts an activation procedure on a specific service channel, that cannot be utilized for the normal operation, with nominal frequency equal to the activation frequency (therefore, in this case the wireless communication link 14 is conducted, for both ways, on the same radio-frequency channel). As the manually-operated control device (11) is also in the "recovery programming" mode, this activation procedure leads the probe 4 to the working condition on the service channel instead of the programmed channel. At this point it is possible to step on to the programming phase according to the foregoing description.

Other feasible variants can be applied to the checking system and to the associated method according to the invention, for example, regarding the programming sequence, and/or the choice to program the interface unit 11 before the probe 4. Systems according to the invention can be implemented according to various other embodiments, the latter including a plurality of base stations 10 connected to the same interface unit 11 (for extending the working range and/or overcoming problems relating to excessive attenuation of the signal) and/or to the manually-operated control device, in other terms the physical integration of the base transceiver unit 10 in the interface unit 11. The number of keys (20, 21) on the panel of the interface unit 11 and/or the activation sequence of these keys can differ with respect to those herein described as an example.

As previously mentioned in various parts of the description, the preferred embodiment of the invention foresees that the base unit 10 and the remote transceiver unit 8 be of the radio-frequency type and consequently define a single two-way channel 14 with radio-frequency transmission. Systems with a single two-way channel of other type (optical, acoustic, . . . ) also fall within the scope of the invention, just as systems with a plurality of channels that however, as discussed above, are less advantageous.

As previously mentioned in the herein illustrated and described preferred embodiment, the manually-operated control device is physically integrated in the interface unit 11 and substantially coincident with the latter. However it is possible, according to the invention, that the former manually-operated control device be implemented as a distinct unit, for example with its own casing, its own keys (20 and 21) and display (22). Furthermore, said distinct unit can be connected to the base station 10 or to a separate transceiver unit housed in its own casing and achieve a portable device.

Furthermore, alternative embodiments foresee that the display unit 22 be separate from the manually-operated control device and be integrated, for example, in the base station 10 or in the probe 4. In this latter case, the transmission of signals indicative of the parameters and of the associated values to be displayed is simplified as the display unit 22 is directly connected to the logic unit 36. Systems in which the detecting device includes components that differ from the microswitch 13, for example transducers that provide continuous signals of the digital or analogue type, also fall within the scope of the invention.

The invention claimed is:

1. A system for checking the position and/or the dimensions of mechanical pieces, comprising:
   a checking probe with
      detecting devices,
      power supply devices,
      a logic unit,
      memory devices adapted for storing values of at least one operation parameter of the checking probe, and
      a remote transceiver unit for wireless transmission and reception of signals,
   a base transceiver unit for the wireless transmission and reception of the signals to and from said remote transceiver unit,
   a display device adapted for displaying, on the basis of signals received from the remote transceiver unit, information regarding said at least one operation parameter and an associated value, and a manually-operated control device, connected to the base transceiver unit and adapted for generating, upon an operator's manual control, control signals and for transmitting said control signals by means of the base transceiver unit, said logic unit of the checking probe being adapted for selecting the value of said at least one operation parameter in response to the control signals received by means of the remote transceiver unit and to provide signals indicative of said at least one operation parameter and of the associated value, wherein the logic unit is adapted to provide, according to a coded sequence and in response to the received control signals, signals indicative of current selectable values of said at least one operation parameter, the display device displaying in sequence said current selectable values of said at least one operation parameter, said control signals being adapted to send to the logic unit either an updating control or a confirmation control to control the updating or the confirmation of the current selectable value displayed on the display device.

2. The system according to claim 1, wherein said display device is connected to the base transceiver unit, said indicative signals being wirelessly transmitted from the remote unit to the base transceiver unit.

3. The system according to claim 2, wherein the manually-operated control device includes said display device.

4. The system according to claim 1, including an interface unit, connected to said base transceiver unit, that includes said manually-operated control device.

5. The system according to claim 4, wherein said remote transceiver unit and said base transceiver unit define a single wireless two-way communication link.

6. The system according to claim 5, wherein the remote transceiver unit is adapted for transmitting by means of said single wireless two-way communication link detection signals generated in the checking probe by the detecting devices.

7. The system according to claim 5, wherein the base transceiver unit is adapted for transmitting by means of said single wireless two-way communication link signals for activating the checking probe on the basis of signals generated in the interface unit.

8. The system according to claim 1, wherein said remote unit and said base transceiver unit communicate using radio-frequency.

9. The system according to claim 8, wherein each of said base transceiver unit and said remote transceiver unit includes an antenna.

10. The system according to claim 8, wherein said at least one operation parameter of the checking probe is the transmission frequency of the remote transceiver unit.

11. The system according to claim 1, wherein said memory devices include a temporary register and a non-volatile memory.

12. The system according to claim 1, wherein said manually-operated control device includes at least one key and is adapted for generating said control signals in response to manual activation of said at least one key by the operator.

13. The system according to claim 1, wherein said manually-operated control device includes two keys and is adapted for generating said control signals in response to manual activation of said two keys by the operator.

14. The system according to claim 1, for the checking of mechanical pieces in a machine tool, wherein the checking probe is a contact detecting probe and the detecting devices include a microswitch.

15. A method for selecting a value of at least one operation parameter in a system for checking the position and/or the dimensions of mechanical pieces, the system comprising a checking probe with a logic unit, memory devices, and a remote transceiver unit for wireless transmission and reception of signals, a base transceiver unit for the wireless transmission and reception of signals to and from said remote transceiver unit, a display device, and a manually-operated control device connected to said base transceiver unit, the method comprising:

generating in the logic unit, and transmitting to the display device, according to a coded sequence, signals indicative of said at least one operation parameter and of an associated current selectable value, displaying in the display device, on the basis of said indicative signals, information regarding said at least one operation parameter and associated current selectable value, and generating, in the manually-operated control device, and transmitting from the base transceiver unit to the remote transceiver unit, control signals controlling the logic unit, said control signals being generated in response to a control manually provided by an operator on the basis of information regarding the current selectable values of said at least one operation parameter displayed in sequence on the display device, each of said control signals being adapted to send either an updating control or a confirmation control to control the logic unit to update or to confirm the current selectable value of said at least one operation parameter that is currently displayed.

16. The method according to claim 15, wherein said display device is connected to the base transceiver unit, and wherein said transmission of the indicative signals occurs wirelessly, from the remote transceiver unit to the base transceiver unit.

17. The method according to claim 15, further comprising:

selecting a value of two or more operation parameters of a system in which said memory devices include a temporary register, and storing in said temporary register the current selectable value of each of said two or more operation parameters, as a consequence of the generating step.

18. The method according to claim 17, in a system in which said memory devices further include a non volatile memory, the method further comprising:

generating, in the manually-operated control device in response to a control manually provided by an operator, control signals corresponding to confirmation controls of selections made, and transmitting said control signals from the base transceiver unit to the remote transceiver unit, and storing in the non-volatile memory, the values selected and stored in said temporary register.

19. The method according to claim 18, wherein said remote transceiver unit and said base transceiver unit are of the radio-frequency type, and wherein one of said two or more operation parameters of the system is a transmission and reception frequency of the remote transceiver unit.

* * * * *